United States Patent (10) Patent No.: US 11,208,161 B2
Asai (45) Date of Patent: Dec. 28, 2021

(54) VEHICLE SYSTEM

(71) Applicant: TOYOTA JIDOSHA KABUSHIKI KAISHA, Toyota (JP)

(72) Inventor: Kentaro Asai, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 87 days.

(21) Appl. No.: 16/728,168

(22) Filed: Dec. 27, 2019

(65) Prior Publication Data

US 2020/0262495 A1 Aug. 20, 2020

(30) Foreign Application Priority Data

Feb. 18, 2019 (JP) .............................. JP2019-026817

(51) Int. Cl.
*B62D 41/00* (2006.01)
*B60W 10/30* (2006.01)
*G05D 1/02* (2020.01)
*G05D 1/00* (2006.01)
*B60W 50/00* (2006.01)

(52) U.S. Cl.
CPC ............. *B62D 41/00* (2013.01); *B60W 10/30* (2013.01); *G05D 1/0061* (2013.01); *G05D 1/021* (2013.01); *B60W 2050/0075* (2013.01); *B60W 2422/90* (2013.01); *B60W 2556/10* (2020.02)

(58) Field of Classification Search
CPC ...... B62D 41/00; G05D 1/021; G05D 1/0061; G08G 1/205; G07C 5/0866; G07C 5/008; G06Q 30/0645; B60W 2050/007; B60W 10/30; B60W 2050/0089; B60W 2422/90; B60W 60/00; B60W 2540/043; B60W 2556/45; B60W 50/0205; B60W 50/00
See application file for complete search history.

(56) References Cited

U.S. PATENT DOCUMENTS 9,646,428 B1 * 5/2017 Konrardy .............. B60W 30/16
10,354,230 B1 * 7/2019 Hanson .................. G07B 15/00
10,672,258 B1 * 6/2020 Kelsh ................... G08B 25/016
2011/0063099 A1 * 3/2011 Miller .................... G09B 19/16
340/439
2017/0294120 A1 10/2017 Ootsuji

FOREIGN PATENT DOCUMENTS

WO 2016/080070 A1 5/2016

* cited by examiner

*Primary Examiner* — Rodney A Butler
(74) *Attorney, Agent, or Firm* — Oliff PLC

(57) ABSTRACT

In a vehicle system, a driver information acquisition unit acquires information about a driver of a vehicle. A detection unit detects that there is a possibility that the vehicle has been damaged. An identification unit identifies a driver of the vehicle when it is detected that there is a possibility that the vehicle has been damaged, based on the acquired driver information.

3 Claims, 3 Drawing Sheets

VEHICLE SYSTEM

INCORPORATION BY REFERENCE

The disclosure of Japanese Patent Application No. 2019-026817 filed on Feb. 18, 2019 including the specification, drawings and abstract is incorporated herein by reference in its entirety.

BACKGROUND

1. Technical Field

The disclosure relates to a vehicle system that detects that there is a possibility that a vehicle has been damaged.

2. Description of Related Art

In recent years, development of automatic driving vehicles has advanced. As an automatic driving system to be mounted on automatic driving vehicles, there is known an automatic driving system that selects an automatic driving function depending on a situation surrounding the vehicle and stores an hour of automatic driving of the vehicle and information indicating the automatic driving function selected at the hour (see International Publication No. WO 2016/080070, for example). In this system, in the case where an accident or abnormality of the vehicle occurs, it is possible to know what automatic driving function was selected at that time and the locus of responsibility for the accident or the like afterward.

SUMMARY

There is known a vehicle sharing service called car sharing. In the service, a plurality of users use a single vehicle in turn. In many cases, the vehicle is not returned to an administrator of the service or an owner of the vehicle, in the middle. Therefore, in the case where the vehicle has been damaged, it is difficult for the administrator or the owner to identify which user has damaged the vehicle.

The disclosure has been made in view of the circumstance, and an object of the disclosure is to provide a vehicle system that makes it possible to clarify the locus of the responsibility for the damage of the vehicle.

For solving the above problem, a vehicle system according to an aspect of the disclosure includes: a driver information acquisition unit that acquires information about a driver of a vehicle; a detection unit that detects that there is a possibility that the vehicle has been damaged; and an identification unit that identifies a driver of the vehicle when it is detected that there is a possibility that the vehicle has been damaged, based on the acquired driver information.

With this aspect, since the driver of the vehicle when it is detected that there is a possibility that the vehicle has been damaged is identified, it is possible to know the driver when the vehicle has been damaged.

The detection unit may include: a first acquisition unit that acquires whether there is a possibility that the vehicle has come in contact with an obstacle; a first determination unit that determines that there is a possibility that the vehicle has been damaged, in a case where there is a possibility that the vehicle has come in contact with the obstacle; a second acquisition unit that acquires failure information about the vehicle; and a second determination unit that determines whether there is a possibility that the vehicle has been damaged, based on the failure information.

The vehicle may be able to switch a driving mode to an automatic driving mode or a manual driving mode, and the vehicle system may further include a third acquisition unit that acquires information about the driving mode, in a case where it is detected that there is a possibility that the vehicle has been damaged, and an estimation unit that estimates whether the driver is responsible for the damage of the vehicle, based on information indicating that there is a possibility that the vehicle has come in contact with the obstacle or the failure information, and the information about the driving mode.

The vehicle system may further include a pickup unit that picks up at least one of an image of a periphery of the vehicle and an image of an interior of a vehicle cabin, in a case where it is detected that there is a possibility that the vehicle has been damaged.

The vehicle system may further include a notification unit that gives notice of information about the driver identified by the identification unit, to a terminal device.

With the disclosure, it is possible to clarify the locus of the responsibility for the damage of the vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
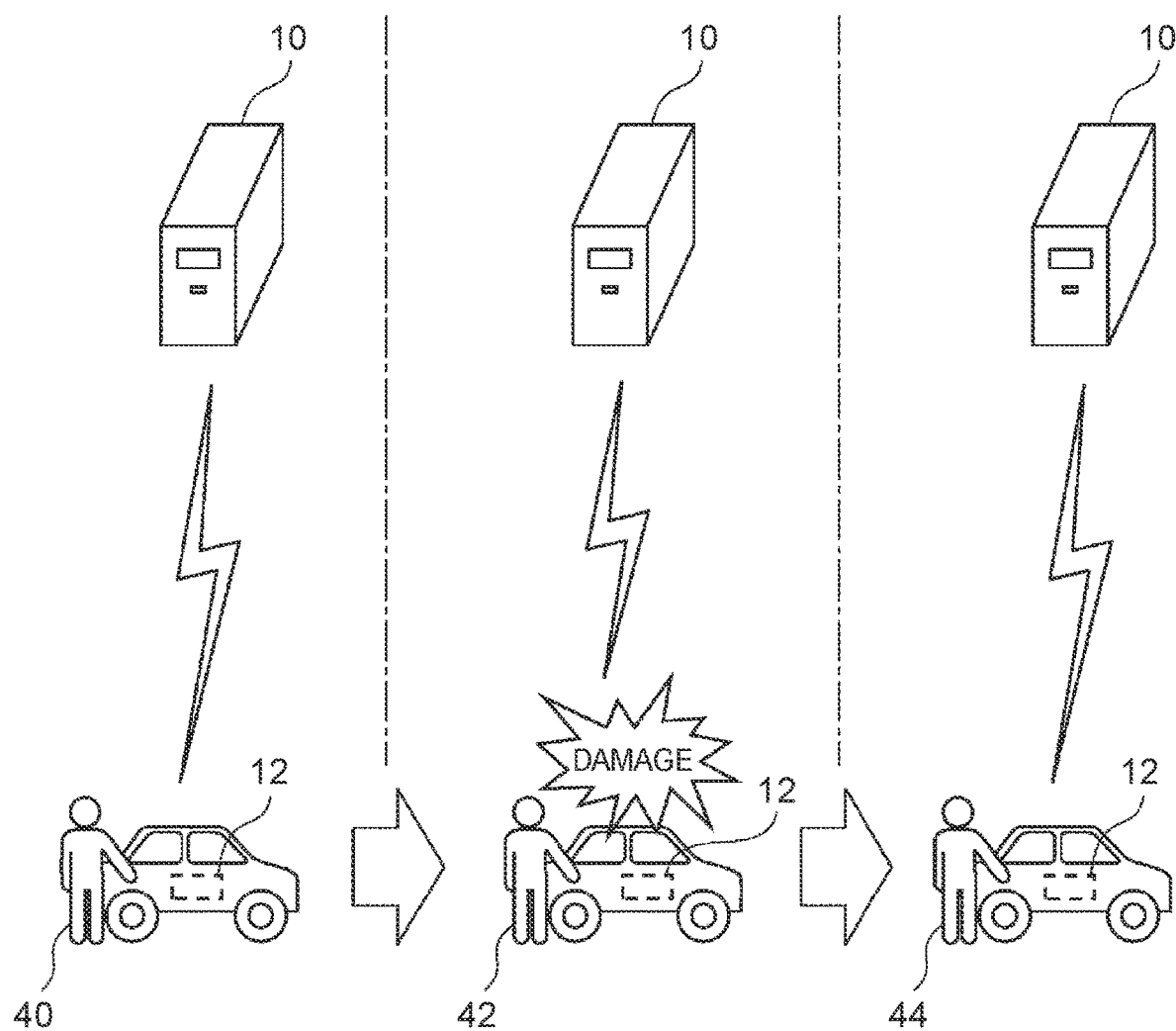
FIG. 1 is a diagram for describing a vehicle system in an embodiment.

FIG. 1 is a diagram for describing a vehicle system in an embodiment. FIG. 1 shows an aspect in which a single vehicle to be rented by a car sharing service is used by a first driver 40, a second driver 42 and a third driver 44, in turn. In the vehicle, an in-vehicle device 12 is provided, and the in-vehicle device 12 is connected with a server device 10 through a network.

It is assumed that the car sharing service is a car sharing service in which a vehicle owned by an owner is rented to a user. On this occasion, the user can set a return place for the vehicle freely to some extent. When the vehicle is rented to a plurality of users in turn, the vehicle is not sometimes returned to the owner in the middle. In FIG. 1, the owner of the vehicle rents the vehicle to the first driver 40, and thereafter, rents the vehicle in succession. Then, the vehicle is returned from the third driver 44. Here, in the case where the second driver 42 has damaged the vehicle, it is difficult for the owner to identify which driver of the first driver 40, the second driver 42 and the third driver 44 has damaged the vehicle, even when the owner is aware of the returned vehicle.

Other than the above example, there is known an aspect in which a business operator of the car sharing service possesses a plurality of vehicles and return places for the vehicles are previously set parking places. Usually, no administrators or no staffs of the car sharing service stand by at the return places for the vehicles. Therefore, when the vehicle has been damaged, it is not easy to identify which driver has damaged the vehicle.

Hence, in the case where the in-vehicle device 12 detects that there is a possibility that the vehicle has been damaged, the server device 10 identifies the driver of the vehicle at that time. Thereby, in the case where the vehicle has been actually damaged as a result of check of the vehicle, the owner of the vehicle or the like can know the driver when the damage has occurred.

Figure 2:
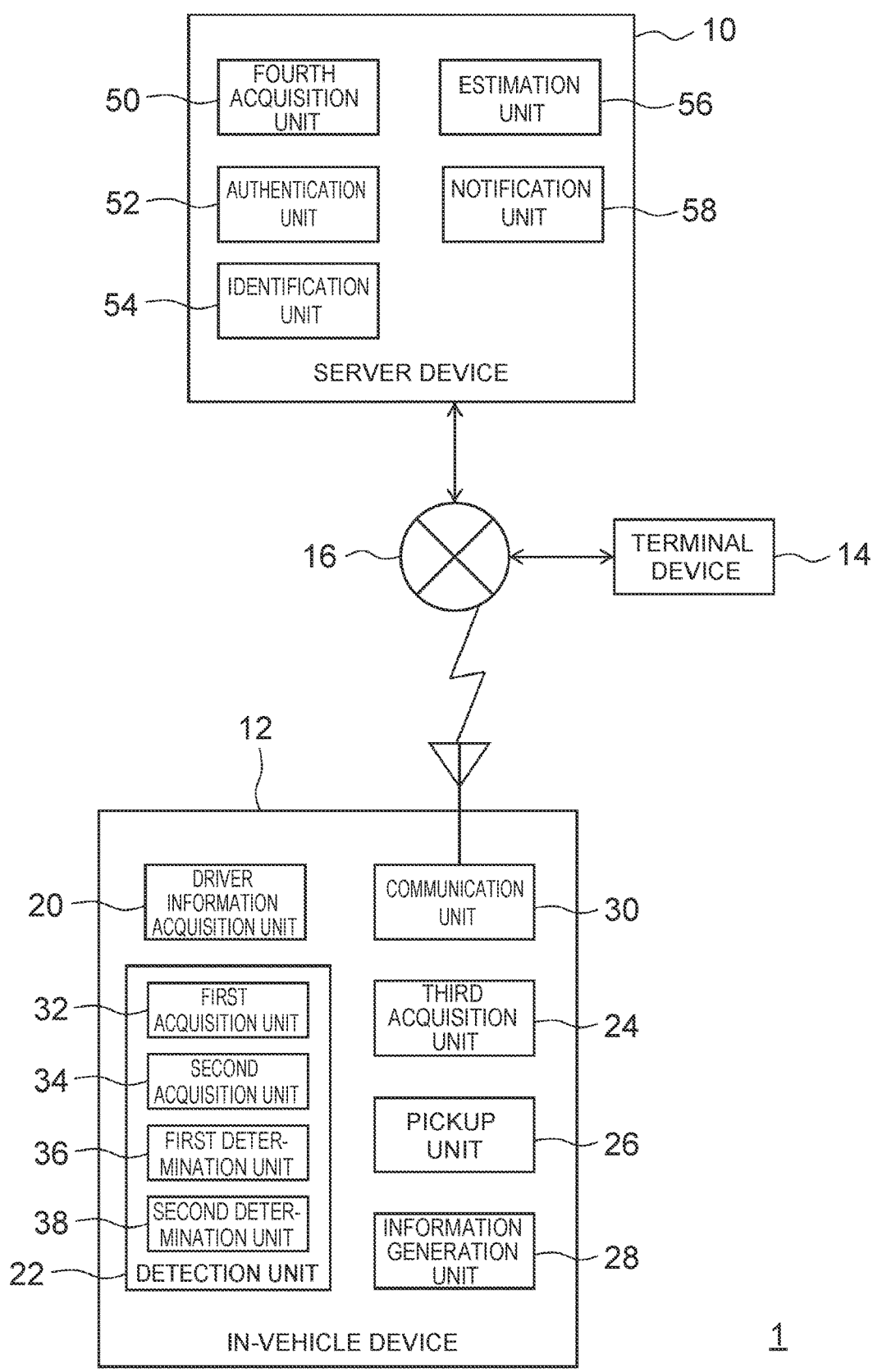
FIG. 2 is a diagram showing a functional configuration of the vehicle system in the embodiment.

FIG. 2 shows a functional configuration of a vehicle system 1 in the embodiment. The vehicle system 1 includes the in-vehicle device 12, the server device 10 and a terminal device 14. The in-vehicle device 12 is mounted on a vehicle that is an automobile. The in-vehicle device 12 has a wireless communication function, and is connected with a network 16 through a wireless base station or a wireless access point. The terminal device 14 is held by the owner of the vehicle, or the like, and is connected with the network 16 by wireless communication or wire communication. The server device 10 is connected with the network 16, and the server device 10 communicates with the in-vehicle device 12 and the terminal device 14 via the network 16. The standard of the wireless communication is particularly limited, and examples of the standard include a third generation mobile communication system (3G), a fourth generation mobile communication system (4G) and a fifth generation mobile communication system (5G).

The vehicle is an automatic driving vehicle, and can switch a driving mode to an automatic driving mode or a manual driving mode. The automatic driving mode may include a fully automatic driving mode in which driving operation by the driver is not necessary and a partially automatic driving mode in which the driving operation by the driver is necessary depending on situation. In the partially automatic driving mode, one of a plurality of automatic driving levels prescribed by Society of Automotive Engineers (SAE) J3016 may be selected, and the automatic driving may be executed.

The in-vehicle device 12 includes a driver information acquisition unit 20, a detection unit 22, a third acquisition unit 24, a pickup unit 26, an information generation unit 28, and a communication unit 30. The server device 10 includes a fourth acquisition unit 50, an authentication unit 52, an identification unit 54, an estimation unit 56 and a notification unit 58.

Constituents of the server device 10 and the in-vehicle device 12 can be realized by a CPU, a memory and another LSI of an arbitrary computer, as hardware, and can be realized by programs and the like loaded in the memory, as software. In FIG. 2, functional blocks to be realized in cooperation of hardware and software are illustrated. Accordingly, a person skilled in the art understands that the functional blocks can be realized in various forms by only hardware, by only software, or by combination of hardware and software.

The driver information acquisition unit 20 of the in-vehicle device 12 accepts an input of driver information from the driver, and sends the acquired driver information to the authentication unit 52 of the server device 10 through the communication unit 30. The driver information includes authentication information such as a user ID and a password. The authentication information may be biometric authentication information such as a face image or fingerprint image of the driver. The driver information to be sent is provided with an ID of the vehicle on which the in-vehicle device 12 is mounted. The driver information acquisition unit 20 may acquire the driver information from a mobile terminal that is owned by the driver.

The server device 10 receives the driver information, and then executes authentication of the driver. The authentication unit 52 of the server device 10 holds the authentication information registered when the driver starts to use the car sharing service, in association with the user ID. The authentication unit 52 holds reservation information in which a date and hour of a reservation and the user ID of the driver having performed the reservation are associated with each other, for each vehicle ID.

In the case where the reservation information about the vehicle ID sent from the in-vehicle device 12 includes a reservation for the current date and hour relevant to the sent user ID and the sent authentication information coincides with held authentication information, the authentication unit 52 determines that the authentication succeeds, and sends information indicating completion of the authentication, to the in-vehicle device 12. The authentication unit 52 holds a history of service use by the driver, based on the driver information acquired by the driver information acquisition unit 20.

After the server device 10 completes the authentication of the driver, the driver information acquisition unit 20 sends the driver information to the information generation unit 28. After the completion of the authentication of the driver, the driver can drive the vehicle.

The detection unit 22 detects that there is a possibility that the vehicle has been damaged. The detection unit 22 includes a first acquisition unit 32, a second acquisition unit 34, a first determination unit 36 and a second determination unit 38.

The first acquisition unit 32 acquires whether there is a possibility that the vehicle has come in contact with an obstacle. For example, the first acquisition unit 32 acquires the distance between the vehicle and the obstacle, based on a detection result of a surround sensor (not illustrated) provided on the vehicle. In the case where the acquired distance is equal to or shorter than a predetermined distance indicating an abnormal closeness to the obstacle, the first acquisition unit 32 determines that there is a possibility that the vehicle has come in contact with the obstacle. In the case where the acquired distance is longer than the predetermined distance, the first acquisition unit 32 determines that there is no possibility that the vehicle has come in contact with the obstacle. The predetermined distance can be appropriately set by experiment or the like, and for example, is several centimeters or shorter. If the surround sensor can detect a distance of zero cm, the predetermined distance may be zero cm. For example, the surround sensor is a distance sensor such as a clearance sonar. The surround sensor may be a sensor that detects the contact of a body of the vehicle with the obstacle. In this case, the first acquisition unit 32 may determine that there is a possibility that the vehicle has come in contact with the obstacle, when the surround sensor detects the contact with the obstacle.

Based on the information acquired by the first acquisition unit 32, in the case where there is a possibility that the vehicle has come in contact with the obstacle, the first determination unit 36 determines that there is a possibility that the vehicle has been damaged, and sends information indicating that there is a possibility that the vehicle has come in contact with the obstacle, to the information generation unit 28. Thereby, it is possible to detect that there is a possibility that the body has been damaged.

An ECU (not illustrated) of the vehicle diagnoses a failure of a previously set component of the vehicle, using a well-known technology. In the case where the failure is identified by the diagnosis, the ECU outputs failure information. For example, the failure information is a diagnosis code. The second acquisition unit 34 acquires the failure information about the vehicle from the ECU.

The second determination unit 38 determines whether there is a possibility that the vehicle has been damaged, based on the failure information. In the case where the failure information related to the damage of the vehicle is acquired, the second determination unit 38 determines that there is a possibility that the vehicle has been damaged, and outputs the failure information to the information generation unit 28. The failure information related to the damage of the vehicle is previously set, and for example, includes failure information indicating an abnormality of air pressure of a tire, failure information indicating an abnormality of various switches in a vehicle cabin, and failure information indicating an abnormality of accessories in the vehicle cabin, that is, an abnormality of a navigation system, an audio system and the like. In the case where the failure information indicating the abnormality of the air pressure of the tire is acquired, there is a possibility that the tire has been blown out. In the case where the failure information indicating the abnormality of the various switches in the vehicle cabin is acquired, there is a possibility that a switch has been damaged. In the case where the failure information indicating the abnormality of the accessories in the vehicle cabin is acquired, there is a possibility that an accessory has been damaged. Thereby, it is possible to detect that there is a possibility of the damage of the tire, the various switches and accessories in the vehicle cabin, and the like.

In the case where the failure information not related to the damage of the vehicle is acquired, the second determination unit 38 determines that there is no possibility that the vehicle has been damaged. For example, the failure information not related to the damage of the vehicle includes failure information indicating an abnormality of battery voltage, and failure information indicating an abnormality of a sensor of an engine.

The pickup unit 26 includes a camera. In the case where the detection unit 22 detects that there is a possibility that the vehicle has been damaged, the pickup unit 26 picks up an image of the periphery of the vehicle and an image of the interior of the vehicle cabin, and outputs the picked images to the information generation unit 28. For example, the image of the periphery of the vehicle is an overhead image when the periphery of the vehicle is viewed from above the vehicle, and is an image allowing the identification of whether the vehicle has come in contact with the obstacle. The image of the interior of the vehicle cabin is an image of accessories, various switches and the like in the vehicle cabin, and is an image allowing the identification of whether the accessories, the various switched and the like have been damaged. In the case where there is a possibility that the vehicle has come in contact with the obstacle, the pickup unit 26 may pick up the image of the periphery of the vehicle, without picking up the image of the interior of the vehicle cabin. In the case where the failure information related to the damage of the vehicle is acquired, the pickup unit 26 may pick up the image of the interior of the vehicle cabin, without picking up the image of the periphery of the vehicle. Thereby, it is possible to reduce the data volume of images.

The image of the periphery of the vehicle can be an evidence of the damage of the body due to the contact of the vehicle with the obstacle by the driver. The image of the interior of the vehicle cabin can be an evidence of the damage of accessories, various switches and the like in the vehicle cabin by the driver.

In the case where the detection unit 22 detects that there is a possibility that the vehicle has been damaged, the third acquisition unit 24 acquires information about the driving mode of the vehicle, and outputs the information to the information generation unit 28.

In the case where the detection unit 22 detects that there is a possibility that the vehicle has been damaged, the information generation unit 28 generates situation information about the vehicle at the time of the detection of the possibility that the vehicle has been damaged, and sends the generated situation information to the fourth acquisition unit 50 of the server device 10, through the communication unit 30. The situation information about the vehicle that is sent is provided with the vehicle ID. The situation information about the vehicle includes the driver information, the information indicating that there is a possibility that the vehicle has come in contact with the obstacle or the failure information, the image of the periphery of the vehicle, the image of the interior of the vehicle cabin, driving mode information, and the hour of the detection of the possibility that the vehicle has been damaged.

The fourth acquisition unit 50 of the server device 10 acquires the situation information about the vehicle that is sent from the in-vehicle device 12, and outputs the acquired situation information to the identification unit 54, the estimation unit 56 and the notification unit 58.

The identification unit 54 identifies the driver of the vehicle when it is detected that there is a possibility that the vehicle has been damaged, based on the driver information that is included in the situation information about the vehicle, and outputs information relevant to the identified driver, to the notification unit 58. The identification of the driver may be executed based on the use history of the driver that is held in the authentication unit 52.

The estimation unit 56 estimates whether the driver is responsible for the damage of the vehicle, based on the information indicating that there is a possibility that the vehicle has come in contact with the obstacle or the failure information, which is information included in the situation information about the vehicle, and the information about the driving mode, and outputs the estimated information indicating whether the driver is responsible, to the notification unit 58. In the case where the driver is responsible, the estimation unit 56 may estimate the ratio of the responsibility, and may output the ratio of the responsibility to the notification unit 58.

For example, in the case of the fully automatic driving mode, the estimation unit 56 estimates that the driver is not responsible for the damage caused by the driving operation. The damage caused by the driving operation includes the blowout of the tire, the damage of the body due to the contact with the obstacle, and the like.

In the case of the partially automatic driving mode, the estimation unit 56 estimates that the driver is responsible for the damage caused by the driving operation and the ratio of the responsibility of the driver is 50%, for example. In this case, the estimation unit 56 may change the ratio of the responsibility of the driver depending on the automatic driving level, and may set the ratio of the responsibility of the driver to a lower ratio, for an automatic driving level at which the probability of involvement of the driver in the driving operation is lower.

The estimation unit 56 estimates that the driver is responsible for the damage of accessories and switches in the vehicle and the ratio of the responsibility is 100%, regardless of the driving mode.

In the case of the manual driving mode, the estimation unit 56 estimates that the driver is responsible for all damages and the ratio of the responsibility is 100%. Thereby, it is possible to clarify whether the driver is responsible for the damage for the vehicle, and if the driver is responsible, it is possible to clarify the degree of the responsibility.

The notification unit 58 gives notice that there is a possibility that the vehicle has been damaged, notice of the driver at that time, notice of whether the driver is responsible, and notice of the situation information about the vehicle, to the terminal device 14, based on the situation information about the vehicle, an identification result of the identification unit 54 and an estimation result of the estimation unit 56. The terminal device 14 to which the notice is given is decided based on the vehicle ID provided in the situation information about the vehicle. After receiving the notice, the terminal device 14 displays information indicating that there is a possibility that the vehicle has been damaged, the driver at that time, information indicating whether the driver is responsible, and the situation information about the vehicle. Thereby, the owner of the vehicle or the like can recognize that there is a possibility that the vehicle has been damaged, and can know the driver at that time, the responsibility of the driver, and the like.

In the case where the situation information about the vehicle includes the information indicating that there is a possibility that the vehicle has come in contact with the obstacle, the owner of the vehicle or the like can check whether the body of the vehicle has been actually damaged, after the vehicle is returned from the driver. On this occasion, the owner or the like can easily know what part should be checked, based on the image of the periphery of the vehicle that is included in the situation information about the vehicle. In the case where the situation information about the vehicle includes the failure information, the owner or the like can check whether a part related to the failure information has been actually damaged. In this way, the owner or the like can know a part that can have been damaged, based on the situation information about the vehicle, and therefore, can check whether the vehicle has been damaged surely and quickly. Further, a damage such as a small scratch that is hard to be recognized at first glance is also found easily without overlooking. The driver at the time of the damage is identified, and whether the driver is responsible for the damage is estimated. Therefore, in some instances, the owner or the like can charge the repair cost to the driver.

Figure 3:
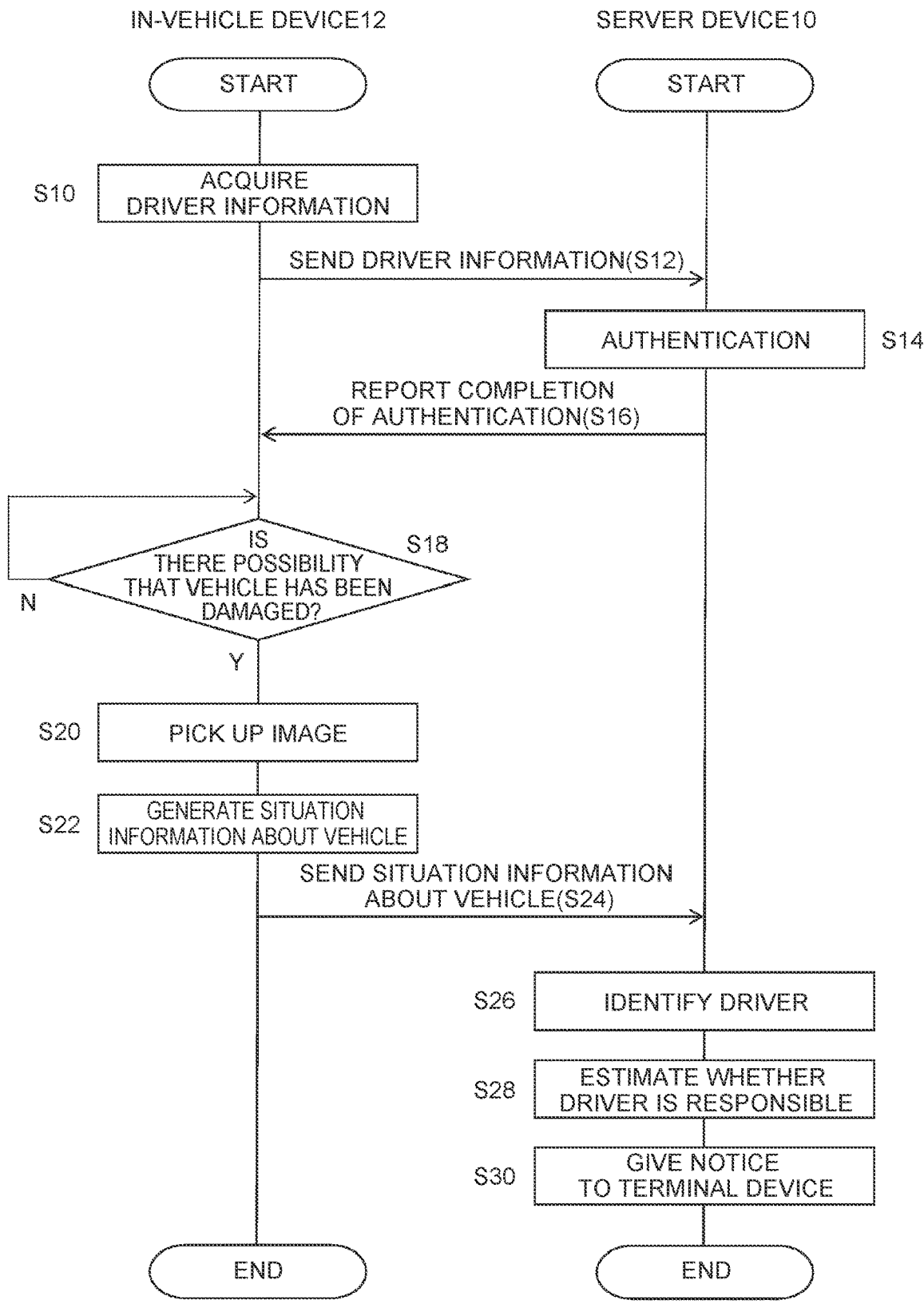
FIG. 3 is a sequence diagram showing a process of the vehicle system in the embodiment.

FIG. 3 is a sequence diagram showing a process of the vehicle system 1 in FIG. 2. The driver information acquisition unit 20 of the in-vehicle device 12 acquires the user ID and the password, that is, the driver information, from the driver (S10), and sends the driver information to the server device 10 (S12). The authentication unit 52 of the server device 10 performs the authentication based on the user ID, the password and the reservation information (S14). When the authentication succeeds, the authentication unit 52 reports the completion of the authentication to the in-vehicle device 12 (S16).

After the completion of the authentication, the driver can drive the vehicle. The detection unit 22 of the in-vehicle device 12 determines whether there is a possibility that the vehicle has been damaged (S18). When there is no possibility that the vehicle has been damaged (N in S18), the detection unit 22 returns to S18. In the case where it is detected that there is a possibility that the vehicle has been damaged (Y in S18), the pickup unit 26 picks up the image of the periphery of the vehicle and the image of the interior of the vehicle cabin at that time (S20), and the information generation unit 28 generates the situation information about the vehicle at that time (S22), and sends the situation information to the server device 10 (S24).

The identification unit 54 of the server device 10 identifies the driver when it is detected that there is a possibility that the vehicle has been damaged, based on the situation information (S26). The estimation unit 56 estimates whether the driver is responsible, based on the situation information (S28). The notification unit 58 gives the notice that there is a possibility that the vehicle has been damaged, the notice of the identified driver, the notice of whether the driver is responsible, and the notice of the situation information, to the terminal device 14 of the owner or the like (S30).

With the embodiment, it is possible to identify the driver when the damage of the vehicle has occurred, and therefore, it is possible to clarify the locus of the responsibility for the damage of the vehicle.

The disclosure has described above, based on the embodiment. The embodiment is just an example, and a person skilled in the art understands that various modifications can be made in combination of the constituent elements and the processes and the modifications are also included in the scope of the disclosure.

In the embodiment, the driver information acquisition unit 20, the detection unit 22, the third acquisition unit 24 and the information generation unit 28 are included in the in-vehicle device 12, but may be provided in the server device 10. In this case, the in-vehicle device 12 sends the driver information accepted from the driver, the detection result of the surround sensor and the failure information, to the server device 10. When the server device 10 detects that there is a possibility that the vehicle has been damaged based on the sent information, the server device 10 requests the in-vehicle device 12 to send the information about the driving mode and the images. The server device 10 receives the information about the driving mode and the images. Then, the server device 10 generates the situation information, identifies the driver, and estimates whether the driver is responsible. Further, the identification unit 54 and the estimation unit 56 included in the server device 10 may be provided in the in-vehicle device 12. In this case, the in-vehicle device 12 identifies the driver, and estimates whether the driver is responsible. Then, the in-vehicle device 12 sends also the identification information and the estimation information to the server device 10. In these modifications, it is possible to enhance the flexibility of the configuration of the vehicle system 1.

The in-vehicle device 12 may include a position acquisition unit that acquires position information about the vehicle using a global positioning system (GPS) and that outputs the acquired position information about the vehicle to the information generation unit 28. In the case where it is detected that there is a possibility that the vehicle has been damaged, the information generation unit 28 adds the position information to the situation information about the vehicle. In this modification, it is possible to identify a place where the vehicle can have been damaged.

The user authentication may be executed by the driver information acquisition unit 20. In that case, the driver information acquisition unit 20 acquires the authentication information and the reservation information from the server device 10, and executes the authentication based on the authentication information, the reservation information and the driver information. In this modification, it is possible to enhance the flexibility of the configuration of the vehicle system 1.

The vehicle may be a vehicle in which the driver executes all driving operations, instead of the automatic driving vehicle. In that case, the third acquisition unit 24 does not need to be provided. In this modification, it is possible to enhance the flexibility of the configuration of the vehicle system 1.

The vehicle system 1 may be used in a car sharing service in which the authentication of the driver is not executed when the vehicle owned by the owner is rented. In this case, the user reservation for the vehicle is managed in the server device 10 and the terminal device 14, and the owner hands over a key of the vehicle to the driver having performed the reservation, at a reservation hour, so that the driver can drive the vehicle. After the use, the vehicle and the key are returned to the owner. Since the authentication of the driver is not executed, the in-vehicle device 12 does not need to include the driver information acquisition unit 20, and the server device 10 does not need to include the authentication unit 52. The server device 10 includes the driver information acquisition unit 20. Based on the reservation information at an hour when it is detected that there is a possibility that the vehicle has been damaged, the driver information acquisition unit 20 acquires the driver information at that time. Then, the driver information acquisition unit 20 outputs the driver information to the identification unit 54. In this modification, when the vehicle is returned, the owner easily becomes aware of a small damage that can be overlooked, based on the information given to the terminal device 14.

What is claimed is:

1. A vehicle system comprising:
   an in-vehicle device that is located within a vehicle and includes a first hardware processor and a camera; and
   a server that is located remote from the vehicle and includes a second hardware processor, wherein:
   the in-vehicle device and the server are configured to communicate with each other over a network,
   the first hardware processor of the in-vehicle device is programmed to:
      acquire, from a driver of the vehicle, information about the driver of the vehicle;
      detect that there is a possibility that the vehicle has been damaged by
         (i) determining whether there is a possibility that the vehicle has come in contact with an obstacle based on sensor information indicating a distance between the vehicle and the obstacle,
         (ii) determining that there is the possibility that the vehicle has been damaged in a case where there is the possibility that the vehicle has come in contact with the obstacle,
         (iii) acquiring failure information about the vehicle from an electronic control unit of the vehicle, and
         (iv) determining whether there is the possibility that the vehicle has been damaged based on the failure information,
   the second hardware processor of the server is programmed to:
      identify the driver of the vehicle when it is detected by the first hardware processor that there is the possibility that the vehicle has been damaged, based on the acquired driver information provided by the first hardware processor,
   the camera of the in-vehicle device picks up at least one of (1) an image of a periphery of the vehicle and (2) an image of an interior of a vehicle cabin of the vehicle, in a case where it is detected that there is the possibility that the vehicle has been damaged,
   the camera picks up the image of the periphery of the vehicle without picking up the image of the interior of the vehicle in the case where there is the possibility that the vehicle has come in contact with the obstacle, and
   the camera picks up the image of the interior of the cabin in the case where there is the possibility that the vehicle has been damaged based on the failure information.

2. The vehicle system according to claim 1, wherein:
   the vehicle is configured to switch a driving mode between an automatic driving mode and a manual driving mode; and
   the first hardware processor of the in-vehicle device is further programmed to (a) acquire information about the driving mode, in the case where it is detected that there is the possibility that the vehicle has been damaged, and (b) estimate whether the driver is responsible for the damage of the vehicle, based on information indicating that there is the possibility that the vehicle has come in contact with the obstacle or the failure information, and the information about the driving mode.

3. The vehicle system according to claim 1, wherein the second hardware processor of the server is further programmed to send a notice of information about the driver identified by the second hardware processor to a terminal device.

* * * * *